(12) United States Patent
Ødegaard

(10) Patent No.: US 8,297,623 B2
(45) Date of Patent: Oct. 30, 2012

(54) SWIVEL DEVICE

(75) Inventor: Jens Ødegaard, Nordstrøno (NO)

(73) Assignee: Framo Engineering AS, Bergen (NO)

( * ) Notice: Subject to any disclaimer, the term of this patent is extended or adjusted under 35 U.S.C. 154(b) by 1161 days.

(21) Appl. No.: 11/666,475

(22) PCT Filed: Nov. 1, 2005

(86) PCT No.: PCT/NO2005/000413
§ 371 (c)(1), (2), (4) Date: Mar. 4, 2008

(87) PCT Pub. No.: WO2006/126885
PCT Pub. Date: Nov. 30, 2006

(65) Prior Publication Data
US 2008/0203724 A1    Aug. 28, 2008

(30) Foreign Application Priority Data
Nov. 2, 2004 (NO) .................................. 20044737

(51) Int. Cl.
*F01D 11/04* (2006.01)
(52) U.S. Cl. .................................. 277/431; 277/512
(58) Field of Classification Search .................. 277/308, 277/431, 432, 512
See application file for complete search history.

(56) References Cited

U.S. PATENT DOCUMENTS

| | | | |
|---|---|---|---|
| 3,889,985 A * | 6/1975 | Gartmann | 285/95 |
| 4,234,216 A | 11/1980 | Swanson et al. | |
| 4,647,076 A | 3/1987 | Pollack et al. | |
| 4,819,966 A | 4/1989 | Gibb | |
| 5,052,720 A | 10/1991 | Yoda | |
| 5,697,732 A | 12/1997 | Sigmundstad | |
| 5,760,292 A | 6/1998 | Jostein | |
| 5,788,288 A * | 8/1998 | Jostein | 285/93 |
| 5,895,077 A | 4/1999 | Sigmundstad | |
| 6,234,540 B1 * | 5/2001 | Drijver et al. | 285/98 |
| 6,390,478 B1 * | 5/2002 | Sigmundstad | 277/362 |
| 6,450,546 B1 * | 9/2002 | Montgomery et al. | 285/95 |
| 2002/0043800 A1 * | 4/2002 | Montgomery et al. | 285/95 |

FOREIGN PATENT DOCUMENTS
DE           3725222           2/1989

* cited by examiner

*Primary Examiner* — Gilbert Lee
(74) *Attorney, Agent, or Firm* — Merchant & Gould P.C.

(57) ABSTRACT

The invention relates to a sealing device for a swivel, an improved attachment device and a method for improving a seal in a swivel, where a sealing medium is composed according to the viscosity and chemical composition of the application concerned and has a viscosity substantially over 500 cst and where the sealing medium is pressurized by a pressure transmission unit.

10 Claims, 4 Drawing Sheets

SWIVEL DEVICE

The present invention relates to a sealing device for a fluid transfer channel in a swivel, an improved sealing device and a method for improving an existing seal in a swivel.

BACKGROUND

Swivels are very important in connection, for example, with floating production units. Failure, leakage, etc. in a swivel result in a stoppage of production from parts of or the whole field. The operators therefore take great pains to ensure that a swivel has double seals and that, in the event of leakage of one or more of the seals, it is possible to repair/reduce the leakage without having to completely close down production. There are solutions in the prior art where a spare seal is mounted on the actual swivel, and where it can be installed without dismantling the whole swivel. In these cases, however, the swivels are of a relatively large size and this kind of solution is not suitable, for example, for more compact multi-channel swivels. In our opinion, therefore, this is a solution that is not good enough and is not applicable for all types of swivel.

Leakage of a seal, for example, internally in a swivel can have highly dramatic consequences. Seal leakage may have many causes, such as material failure in seals, defects in the sealing surfaces, typically involving scaling, scratches, wear, etc., puncture of the seal or extrusion of the seal. It is very difficult to safeguard entirely against such causes. An active quality assurance program, extended testing of materials and complete systems are ways to improve the situation, but they do not entirely eliminate the chances of unforeseen error.

In many types of swivels there are barrier-activated seals. This means that the dynamic and the static seals in a swivel can be activated by means of a barrier oil, where the pressure of the barrier oil is always higher than the pressure in the main swivel channel. If a leakage occurs over a seal, this will result in consumption of barrier oil, and this is recorded in control systems so that excessive consumption of the oil triggers an alarm. The operator is therefore made aware that there is consumption of barrier oil and can identify which seal is leaking.

If the leak over the seal is too big, the operator can either choose to continue on the secondary seal or repair the damaged seal. Generally it is undesirable to continue production only on a secondary seal and it takes an unduly long time to dismantle a swivel and replace the damaged seal. This is also expensive since during this period the production being carried out through the swivel has to be closed down. It is therefore desirable to achieve a sealing system that solves this problem while at the same time providing a solution for how the existing damaged seal can be repaired in a very simple manner.

An object of the present invention is to solve the above-mentioned problem and/or improve the situation. It is also an object to provide a solution that can be employed on most types of barrier-activated seals, particularly for barrier-activated seals in swivels used in the oil industry. It is also an object to provide a sealing system that is useful, easy to use and monitor and does not require the whole swivel to be dismantled in order to achieve repair/improvement of the seal. It is also an object to provide a solution where the primary seal in the seal series can continue to be used, even when it is damaged and leaking on account of this.

A sealing device, an improved sealing device and a method are provided that fulfil the above-mentioned objects.

SUMMARY

According to a first aspect, the present invention relates to a sealing device for sealing a fluid transfer channel in a swivel against the environment. The fluid transfer channel, for example a process channel from an oil well or another type of process channel, which has to be sealed in relation to the environment, is composed of at least two elements. The seal may be a seal between two elements rotating relative to each other, a so-called dynamic seal, or it may be a seal between two elements that are static relative to each other. The seal according to the invention may be employed for both these types of seals in a swivel. The swivel may be a swivel with one or more channels. The swivel may also be a so-called compact swivel with one or more channels drilled out in a stem element in the core of the swivel. The sealing device according to the first aspect comprises at least one sealing body disposed between mutually facing surfaces of the two elements, and supply lines for supply of a pressurized sealing medium during use of the fluid transfer channel, normally at a side of the sealing body facing away from the fluid transfer channel. The sealing medium is normally supplied at a pressure that is equal to or higher than the process pressure in the fluid transfer channel that has to be sealed. The result of this is that any leakage over the seal will lead to leakage into the fluid transfer channel and not leakage of fluid from the fluid transfer channel to the environment. Several sealing elements may also be mounted in series behind one another, where the supply lines lead to one or more of the sealing elements located behind one another in series. The sealing medium according to the invention is composed according to the viscosity and chemical composition of the application concerned, i.e. according to the operating conditions of the swivel, type of fluid to be transferred, pressure, temperature, etc. and has a viscosity substantially over 500 cst.

According to a second aspect of the invention, the invention relates to an improved sealing device for a fluid transfer channel against the environment, which channel is composed of at least two elements. The sealing device comprises at least one sealing body disposed between mutually facing surfaces of the two elements and supply lines for supply of a pressurised barrier fluid during use of the fluid transfer channel, normally at a side of the sealing body facing away from the fluid transfer channel. According to the invention, between a portion of the supply line for barrier fluid and the sealing body, the improved sealing device comprises a sealing medium circuit comprising a pressure transmission unit, where supply lines for the sealing medium extend from the pressure transmission unit to the sealing body. The sealing medium preferably has a higher viscosity than the barrier fluid, and in an embodiment a viscosity preferably over 500 cst.

In an embodiment of the improved sealing device according to the second aspect, the sealing medium circuit may be inserted as a parallel circuit in a part of the supply lines to the sealing body, where the barrier fluid is shut off in the parallel circuit and conveyed in towards the sealing medium circuit and the pressure transmission unit, and the sealing medium is conveyed in towards the sealing body. Due to its composition with regard to viscosity and chemical composition, the sealing medium will form a seal round the sealing body and seal or improve any damage incurred in the sealing body and/or in the sealing surfaces.

As an alternative to a parallel circuit, a part of the supply lines may be replaced by the sealing medium circuit, or the parallel circuit for the sealing medium may have its own supply line in towards the sealing body, separate from the supply line for the barrier fluid, but where the barrier fluid is conveyed into the pressure transmission unit instead of towards the sealing body. The sealing medium circuit will normally be provided on an already-existing valve mounted in the supply line in towards the sealing body, so that the sealing medium employs an already-existing supply line to the sealing body, which until the need for repair/improvement was employed for the barrier fluid. The barrier fluid will then be placed in communication with the pressure transmission unit.

By using the barrier fluid as pressure driver in the pressure transmission unit, it is possible to achieve substantially similar pressure in the sealing medium and the barrier fluid, and there is no need to install an extra set of pumps, regulating valves, non-return valves, etc. since the already-existing pressure system in the barrier fluid circuit is being used. This provides a simple and reliable solution. The present invention is also particularly well suited for repair of existing barrier fluid-operated seals.

According to a third aspect of the invention, both the sealing device for use in a swivel and the improved sealing device may comprise a pressure transmission unit which may be in communication with the fluid transferred in the fluid transfer channel and/or with the barrier fluid for transfer of the pressure in these fluids to the sealing medium. Alternatively and/or in addition, the pressure transmission unit may comprise a separate pump unit for the pressure medium, or the pressure transmission unit may be a combination of all these elements. The pressure transmission unit may also comprise a pressure booster for increasing, for example, the pressure in the fluid transferred in the fluid transfer channel. The pressure transmission unit and/or the sealing medium circuit may be provided with reading devices for reading quantity, critical quantity, supplied quantity or other values in connection with the pressure transmission unit and/or the sealing medium circuit.

In a further aspect of the invention, the improved sealing device may be a seal in connection with a swivel, where this may be a high-pressure swivel with at least one fluid channel, which maintains a pressure of over 200 bar in a design for 400 bar. The swivel may also be a compact swivel with one or more channels drilled out in a central core element.

According to a preferred embodiment of the invention the pressure transmission unit comprises a piston cylinder. The piston cylinder comprises a cylinder housing and a piston which divides the housing into two chambers. The piston may be completely free-running or the situation may be envisaged where the piston rod is connected with a pressure booster, whereby the pressure transfer in the pressure transmission unit can be pressure regulated. In order to obtain pressure equalisation, a piston rod through both chambers may also be envisaged in order to obtain equal pressure transfer between the fluids. The supply lines for the barrier fluid according to the second aspect of the invention or process fluid and/or another pressure source are in communication with one side of the piston, and the supply lines for sealing medium are in communication with the other side of the piston, extending from the pressure transmission unit to the sealing element.

The invention also relates to a method for repairing a seal in a swivel, which seal comprises at least one sealing body and a barrier fluid circuit for supply of barrier fluid to the side of the seal facing away from a fluid transfer channel in the swivel. Where loss of barrier fluid is detected in the barrier fluid circuit, a new sealing medium circuit comprising a pressure transmission unit is mounted between the barrier fluid circuit and the sealing body, which sealing medium in the circuit is forced into the seal via the supply line for the barrier fluid circuit or a separate supply line to the sealing body by means of the pressure in the barrier fluid circuit.

BRIEF DESCRIPTION OF THE DRAWINGS

The invention will now be explained in greater detail by embodiments with reference to the attached drawings, in which.

DETAILED DESCRIPTION

Figure 1A:
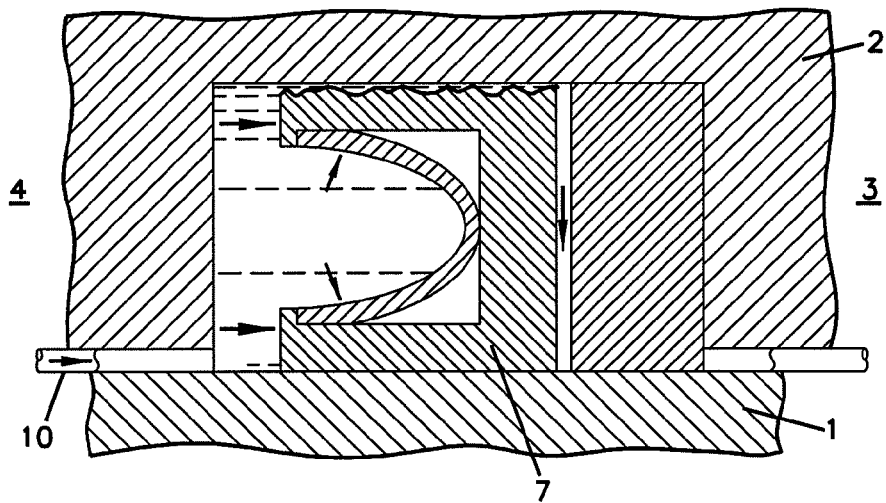
FIGS. 1A-C are principal schematic diagrams illustrating how a barrier fluid-operated seal can leak.

In order to facilitate understanding of the invention, equivalent reference numerals are used for equivalent elements in all the figures.

Figure 1B:
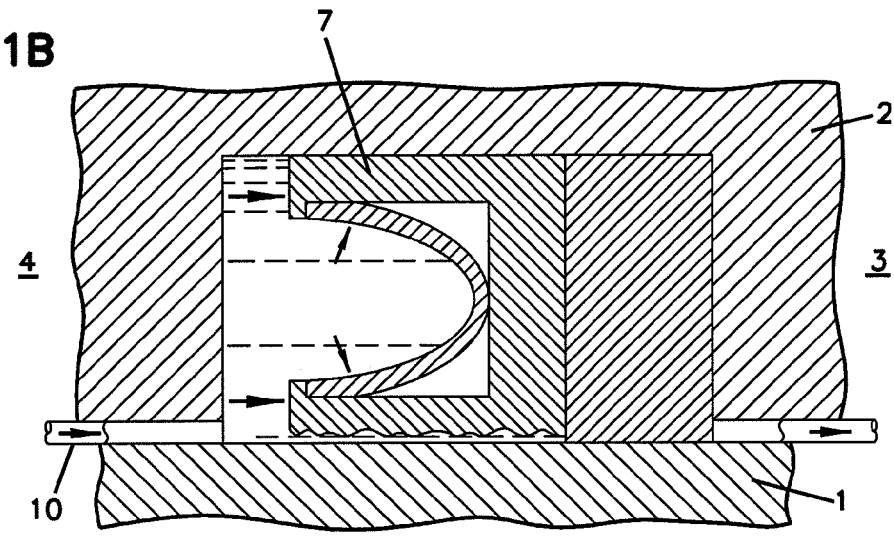
Figure 1C:
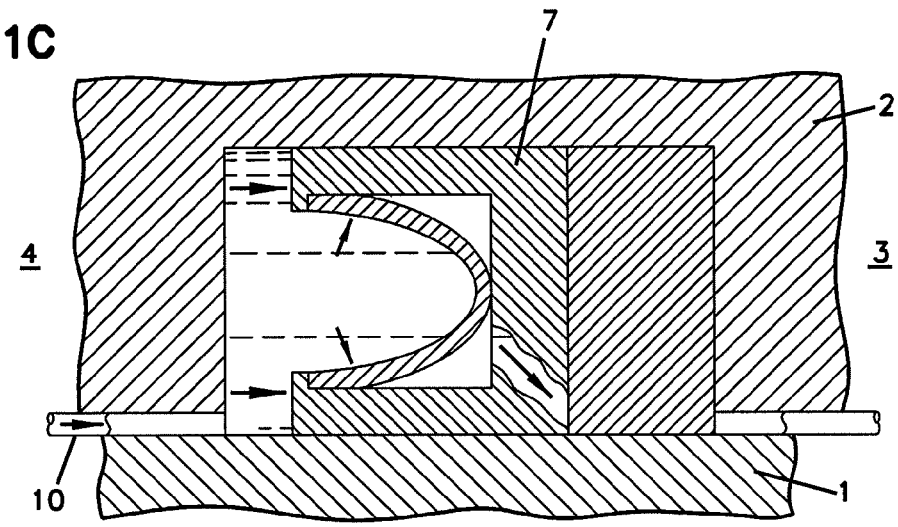

FIGS. 1A-C illustrate three main principles for how a barrier pressure-operated dynamic seal can leak. The seal is located between two mutually facing surfaces where one surface is composed of a first element 1, which may be a rotating element, and a second element 2, which may be a static element. The sealing device comprises a sealing body 7. In the illustrated embodiment the sealing body 7 is so designed that the barrier fluid supplied via the supply line 10 forces the sealing body 7 into abutment against the surfaces of the first and second elements, 1 and 2 respectively. The seal is located between a process channel 3 and the environment 4. As illustrated in FIG. 1A, leakage may occur between the sealing body 7 and the surface of the second element 2, whereupon the barrier fluid leaks past the sealing body 7 in towards the process channel 3. A second alternative is leakage between the sealing body 7 and the surface of the first element 1 as illustrated in FIG. 1B. A third alternative is where the actual sealing body 7 leaks, as illustrated in FIG. 1C. All these variants are leakages which cannot be tolerated without something being done about the seal, either by replacing it or alternatively employing a secondary seal. However, a sealing device according to the invention will permit the seals illustrated in FIGS. 1A-C to continue to provide a fluid-tight connection.

Figure 2:
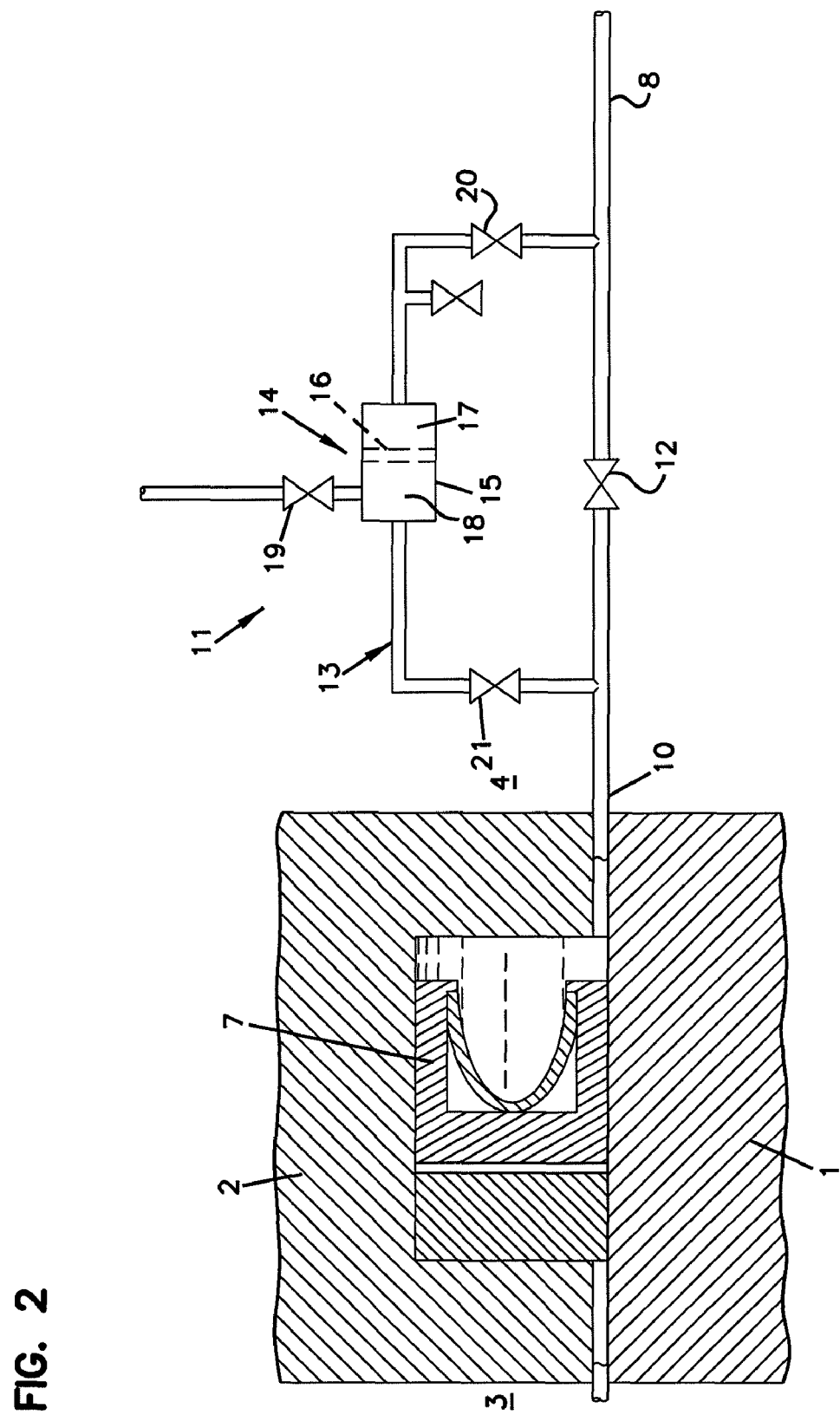
FIG. 2 is a schematic diagram of a part of a sealing device according to the invention.

FIG. 2 is a schematic diagram of a sealing device according to the invention. The sealing device comprises a sealing body 7 mounted between two mutually facing surfaces of a first element 1 aid a second element 2 respectively, which may be a rotating element and a static element. The sealing device seals a process channel 3 from the environment 4. A supply line 10, normally for barrier fluid from the barrier fluid circuit 8 leads to the sealing element 7. A sealing medium circuit 11 is inserted in parallel between the barrier fluid circuit 8 and the sealing body 7. The sealing medium circuit 11 comprises a pressure transmission unit 14, comprising a piston cylinder 15 with a piston 16, which divides the piston cylinder into a first chamber 17 and a second chamber 18. From the pressure transmission unit 14 a sealing medium line 13 extends from the second chamber 18 with a second sealing medium valve 21 for insertion in the barrier fluid circuit and the supply line 10. Furthermore, the barrier fluid circuit is placed in communication with the first chamber 17 of the pressure transmission unit via a first sealing medium valve 20. The first valve 12 can check and control whether barrier fluid or sealing medium is required in towards the sealing body 7. In the sealing medium circuit there is also provided a supply device 19 in case additional sealing medium needs to be supplied due to consumption thereof.

It is, of course, conceivable that the sealing medium supply line 13 does not lead into the supply line 10 via the second sealing medium valve 21, but instead leads directly in towards the sealing body 7, for example through a separate bore, with a valve mounted in this supply line for opening or closing off the sealing medium fluid towards the seal. It is also possible to have a pressure transmission unit without supply means, since the consumption of sealing medium is small and the piston cylinder may be replaced. During insertion the whole piston cylinder will normally also be filled with sealing medium so that the piston is at maximum travel in the direction of the first chamber 17, i.e. as small a first chamber 17 as possible.

Figure 3:
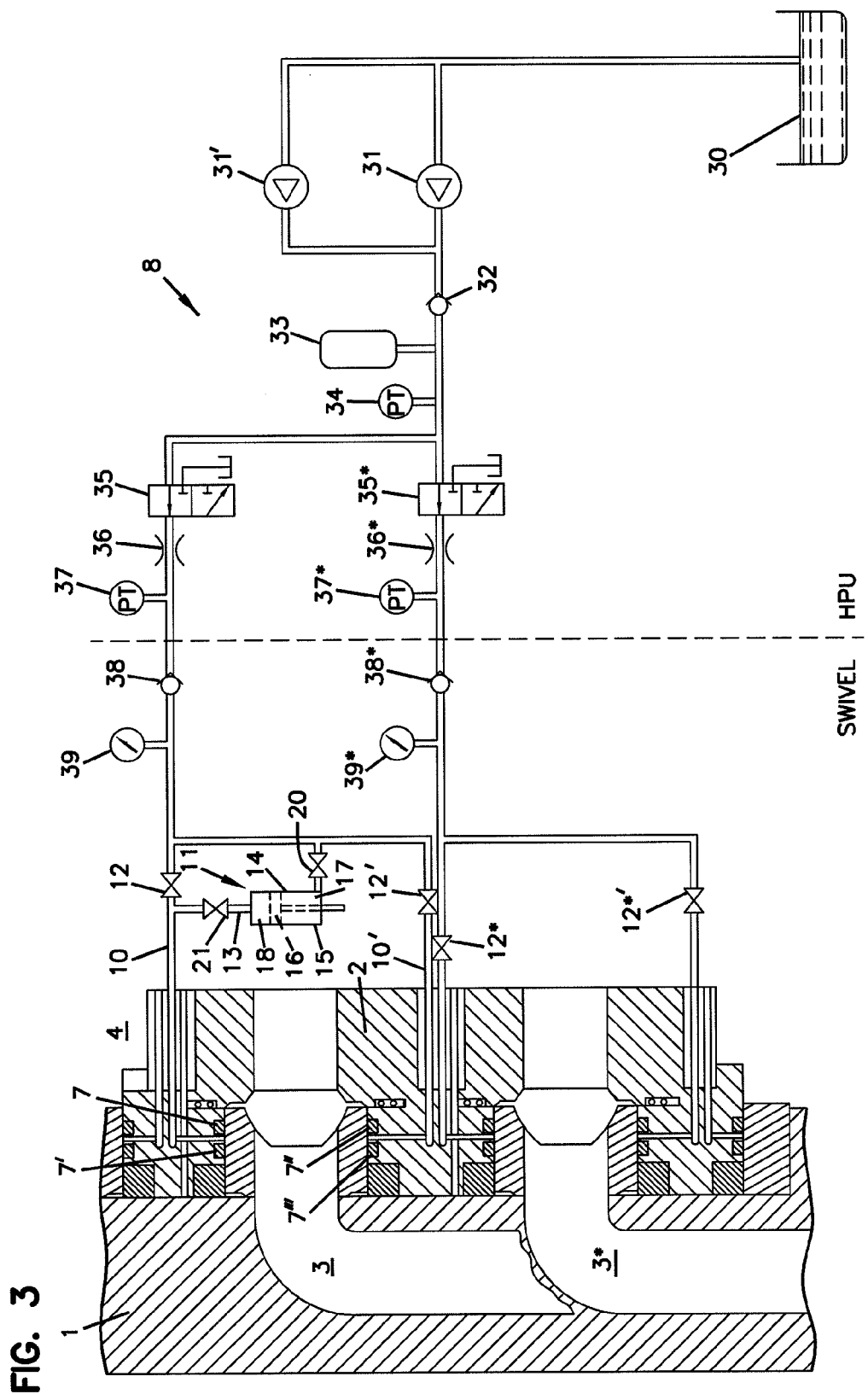
FIG. 3 is a part view of a swivel where a sealing device according to the invention is employed for a seal, and FIGS. 4A and B illustrate two alternative embodiments of a sealing medium circuit according to the invention.

FIG. 3 illustrates the use of a sealing device according to the invention employed in connection with a swivel. The swivel comprises a first rotating element 1 comprising a core element and surrounding annular elements forming in the case illustrated two process channels marked 3 and 3\* respectively, from a substantially vertically oriented bore in the core to a substantially horizontally oriented annulus leading into the second element 2, which is a stator element comprising surrounding annular elements which are pretensioned against each other in a vertical direction by means of a bolt device at the top of the swivel. As in normal swivels, bearings are provided between the mutually rotating elements, and static seals between two mutually static elements. No further explanation is provided of the swivel's components since this does not directly relate as such to the present invention.

For sealing the process channel 3 against the environment 4, two sealing bodies are provided on each side of the process channel, marked by 7 and 7' respectively on the upper side of the process channel 3 in the figure, and 7" and 7'" on the lower side of the process channel. The illustrated swivel thereby has a double barrier on each side of the process channel with a primary and a secondary barrier fluid-operated seal. The barrier fluid is supplied from the barrier fluid circuit 8. Such a barrier fluid circuit may have a number of configurations, an example being illustrated in the figure. The circuit comprises a barrier fluid tank 30 with lines to a pump 31 with a spare pump 31' in parallel. Lines lead from the pumps 31, 31' through a check valve/non-return valve 32, after which an accumulator 33 is mounted for absorbing any volume differences due to, for example, temperature differences in the barrier fluid. After this a pressure sensor 34 is mounted before the barrier fluid circuit divides into two lines for supply of barrier fluid to seals, each round a process channel, marked 3 and 3\* respectively. The lines lead to one process channel 3 through a two-way valve 35, which may convey or shut off barrier fluid to the seal. After the two-way valve 35 there are mounted a venturi valve 36, a pressure sensor 37, a non-return valve 38 before a pressure manometer 39 that continues in towards two first valves 12, 12'. The line divides in two before two first valves 12, 12', for the seals on each side of the process channel 3.

In the case shown here, the first valve 12' for lower sealing round the process channel 3 is illustrated in the open position, with the result that the barrier fluid is conveyed in towards the sealing bodies 7", 7'". The first valve 12 for the upper sealing bodies 7, 7' is shown closed, with the result that the barrier fluid is conveyed in towards the sealing medium circuit 11 and its pressure transmission unit 14, which in the illustrated case comprises a piston cylinder 15 with an internal piston 16. The barrier fluid is passed via an open valve 20 into the first chamber 17 of the pressure transmission unit 14, which transfers the pressure to the sealing medium in the second chamber 18. The sealing medium is passed via the sealing medium line 13 through a second open valve 21 into the supply line 10 and in towards the sealing bodies 7, 7', thereby enabling the upper seal round the process channel 3, which was not fluid-tight against barrier fluid, to be sealed by the sealing medium and providing a leak-proof primary seal, while employing the pressure in the barrier fluid for maintaining this leak-proof function. The lower seal round the process channel 3 is still operated by barrier fluid running in towards the lower seal via the open first valve 12' and the supply line 10' towards the seals 7" and 7'".

The process channel 3\* is illustrated with corresponding elements in the barrier fluid circuit, but with the first valves 12\* and **12\*'** against the seals shown closed.

Figure 4A:
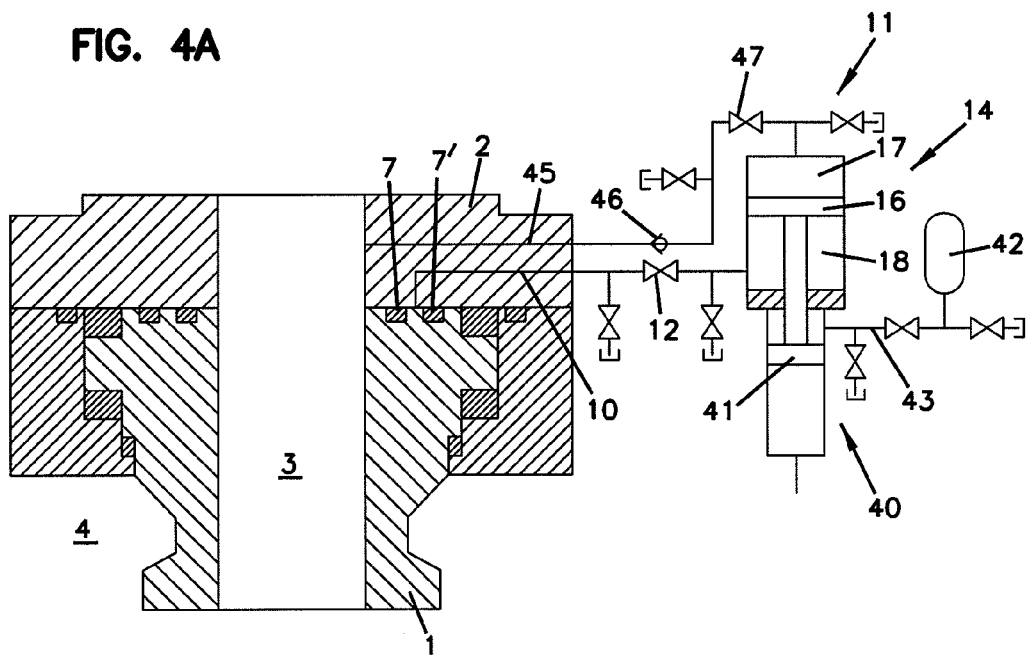
Figure 4B:
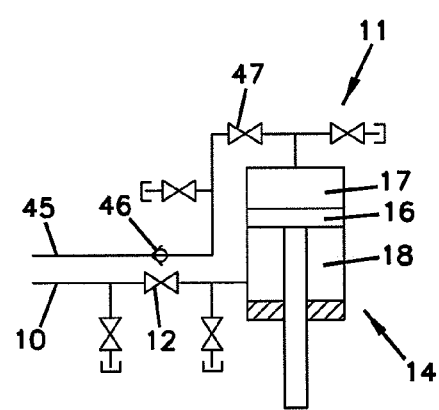

According to a second aspect of the invention the sealing device may be a seal in a swivel as illustrated in FIG. 4A, where a swivel with a rotor part 1 and a stator part 2 comprise a process channel 3 which is sealed by a sealing device according to the invention. The swivel normally also includes bearings and other seals but since these do not form a part of the invention they will not be explained further. Two alternative sealing devices are illustrated in FIGS. 4A and 4B. In FIG. 4A a sealing device is illustrated comprising two sealing elements 7 and 7', which behind the sealing element nearest the process channel receive an activating sealing medium via the supply line 10. In the supply line the sealing device further comprises a first valve 12 and a pressure transmission unit 14. In the illustrated embodiment the pressure transmission unit 14 comprises a piston cylinder with sealing medium in a second chamber 18 on one side of the piston 16, where the first chamber 17 on the other side of the piston 16 is in communication with a process fluid supply line 45 which takes out process fluid from the fluid transfer channel 3. In the process fluid supply line 45 a non-return valve 46 and a regulating valve 47 are located before it leads into the pressure transmission unit 14. Furthermore, the pressure transmission unit 14 is equipped with a gas spring or pressure booster 40 which in the illustrated embodiment comprises an additional piston cylinder with a piston 41 which is connected with the piston 16 in the second piston cylinder via a common piston rod. On one side of the piston 41 a drive fluid is supplied to this second piston cylinder via a drive fluid line 43 from a drive fluid pressure source 42. The pressure transmission unit also comprises a number of safety valves and other technical equipment which is not described in more detail.

In FIG. 4B an alternative is shown where the sealing medium circuit does not include a pressure booster, but otherwise has a similar construction to that in FIG. 4A and we refer to the above description.

The present invention has now been explained by embodiments and as indicated a number of variants and modifications may be envisaged within the scope of the invention as defined in the following patent claims. For example, the pressure transmission unit may be a chamber with two non-mixable fluids, and there may be separate supply lines for the sealing medium in towards the seal. An alternative may be envisaged where the barrier fluid pressure only forms a part of the pressure exerted on the sealing medium or there is a separate pressure supply to the sealing medium. It is conceivable for the pressure transmission unit to be composed of a separate pump unit that pressurises the sealing medium. With regard to a secondary seal in a sealing element series, in some cases the sealing medium will be supplied to a side facing the fluid transfer channel. The invention should be understood to include these variants which are covered by the invention as defined in the following claims.

The invention claimed is:

1. A sealing device for sealing a fluid transfer channel to prevent fluid flowing in the fluid transfer channel from leaking through a sealing body, wherein the fluid transfer channel is composed of two elements, the sealing body mounted between mutually facing surfaces of the two elements, wherein a supply line is provided for the supply of a pressurised barrier fluid during use of the fluid transfer channel, at a side of the sealing body which normally faces away from the fluid transfer channel, wherein the sealing device comprises a supply line for barrier fluid connected to the supply line via a first valve, and a sealing medium circuit comprising a pressure transmission unit, which is connected to the supply line for barrier fluid via a first sealing medium valve and is connected to the supply line via a supply line for sealing medium and second sealing medium valve, wherein the sealing medium has a higher viscosity than the barrier fluid.

2. A sealing device according to claim 1, wherein the sealing medium circuit has a viscosity over 500 cst.

3. A sealing device according to claim 1, wherein the pressure transmission unit is in communication with the fluid in the fluid transfer channel, and/or alternatively the barrier fluid and/or alternatively that the pressure transmission unit comprises a pump unit.

4. A sealing device according to claim 1, wherein the pressure transmission unit comprises a pressure booster.

5. A sealing device according to claim 1, wherein the pressure transmission unit comprises a piston cylinder comprising a cylinder housing and a piston which divides the housing into two chambers, where the supply lines for the barrier fluid are in communication with one side of the piston, and the supply lines for the sealing medium are in communication with the other side of the piston, and extend to the sealing body.

6. A sealing device according to claim 1, wherein the pressure transmission unit is provided with means for reading the quantity and/or quantity supplied and/or a critical quantity of sealing medium and/or comprises supply devices for supply of additional sealing medium.

7. A sealing device according to claim 1, wherein the two elements are movable in relation to each other, with the result that the seal forms a dynamic seal.

8. A sealing device according to claim 1, wherein the sealing device is employed in a swivel comprising at least a rotor body and a stator body forming at least one fluid transfer channel.

9. A sealing device according to claim 8, wherein the swivel is a high-pressure swivel, where at least one of the fluid transfer channels can transfer fluid at a pressure of over 200 bar.

10. A method for providing a seal in a swivel, which seal comprises at least one sealing body and a barrier fluid circuit for supply of barrier fluid to the side of the sealing body normally facing away from a fluid transfer channel in the swivel, and, on detection of loss of barrier fluid in the barrier fluid circuit, a sealing medium circuit comprising a pressure transmission unit is mounted between the barrier fluid circuit and the sealing body, which sealing medium in the circuit is forced in towards the sealing body via the supply line for the barrier fluid circuit or a separate supply line to the sealing body, by means of the pressure in the barrier fluid circuit thereby providing the seal in the swivel, wherein the pressure transmission unit is connected to a supply line for barrier fluid via a first sealing medium valve and is connected to a supply line via a supply line for sealing medium and second sealing medium valve, wherein the sealing medium has a higher viscosity than the barrier fluid.

* * * * *